(12) United States Patent
Xing et al.

(10) Patent No.: US 8,552,092 B2
(45) Date of Patent: *Oct. 8, 2013

(54) SELF-REPAIRING CONCRETE USED UREA-FORMALDEHYDE RESIN POLYMER MICRO-CAPSULES AND METHOD FOR FABRICATING SAME

(75) Inventors: Feng Xing, Guangdong (CN); Zhuo Ni, Guangdong (CN)

(73) Assignees: Shenzhen University, Shenzhen, Guangdong (CN); Feng Xing, Shenzhen, Guangdong (CN); Zhuo Ni, Shenzhen, Guangdong (CN)

( * ) Notice: Subject to any disclaimer, the term of this patent is extended or adjusted under 35 U.S.C. 154(b) by 152 days.

This patent is subject to a terminal disclaimer.

(21) Appl. No.: 12/863,670

(22) PCT Filed: Oct. 24, 2008

(86) PCT No.: PCT/CN2008/072834
§ 371 (c)(1),
(2), (4) Date: Jul. 20, 2010

(87) PCT Pub. No.: WO2009/140837
PCT Pub. Date: Nov. 26, 2009

(65) Prior Publication Data
US 2011/0060074 A1    Mar. 10, 2011

(30) Foreign Application Priority Data
May 20, 2008  (CN) .......................... 2008 1 0067312

(51) Int. Cl.
*C04B 28/00* (2006.01)
*C08K 9/00* (2006.01)

(52) U.S. Cl.
USPC ........... 523/208; 523/205; 106/713; 106/724; 524/2

(58) Field of Classification Search
USPC ................. 524/2; 106/713, 724; 523/205, 208
See application file for complete search history.

(56) References Cited

U.S. PATENT DOCUMENTS

| 6,518,330 B2 * | 2/2003 | White et al. .................. 523/200 |
| 8,362,113 B2 * | 1/2013 | Xing et al. ..................... 523/206 |
| 8,389,605 B2 * | 3/2013 | Xing et al. ..................... 523/401 |
| 2007/0204765 A1 * | 9/2007 | Le Roy-Delage et al. .... 106/802 |
| 2010/0283171 A1 * | 11/2010 | Xing et al. ....................... 264/69 |
| 2012/0161355 A1 * | 6/2012 | Xing et al. ..................... 264/123 |

FOREIGN PATENT DOCUMENTS

JP        2007092419 A  *  4/2007

* cited by examiner

*Primary Examiner* — Vickey Nerangis
(74) *Attorney, Agent, or Firm* — Raymond Y. Chan; David and Raymond Patent Firm

(57) ABSTRACT

A self-repairing concrete includes urea-formaldehyde resin polymer micro-capsules, in which the urea-formaldehyde resin polymer micro-capsules are mixed for a fixed function of micro-cracks. The quality mixture ratio is: concrete/micro capsules/water=100:1-15:15-50. The manufacturing method is weighing a full amount of water in a container, adding urea-formaldehyde resin polymer micro-capsules, stirring, until fully dispersed microcapsules; pouring the water into the mixing container, adding the corresponding quality of cement; stirring; adding sand and gravel filling materials, conducting worksite watering, ⅓ volume for each time, vibrating, and air exhausting; until the paste filling mold.

18 Claims, 2 Drawing Sheets

SELF-REPAIRING CONCRETE USED UREA-FORMALDEHYDE RESIN POLYMER MICRO-CAPSULES AND METHOD FOR FABRICATING SAME

FIELD OF INVENTION

This invention relates to self-repairing concrete and similar building materials, particularly relates to self-repairing concrete, similar building materials, and methods of process.

BACKGROUND OF INVENTION

As a representative of the traditional building materials, concrete takes advantages of high compressive strength, high durability and low cost, widely used in industrial and civil buildings, bridges, road projects, underground projects, water conservancy and hydropower projects, nuclear power plants, ports and marine engineering etc. Currently, concrete has more than 100 years of history from it been invented, which penetrates to large-span structures, high-rise structures, mega-structure and the special structure.

The foreseeable future, during the country's modernization construction, concrete is still an indispensable building materials. Due to the use of long-term process and under the influence of the surrounding complex environment, in-service concrete structures is producing micro-cracking and local damage inevitably, which would reduce the life of the structures lightly, or would threaten structures safety. For raw materials, mixing ratio, additives, manufacturing processes, casting processes methods, and conservation area will be reviewed and improved, these methods didn't fundamentally change the performance of concrete weaknesses. Therefore, to repair the crack of the concrete in service timely and effectively has become a major concern of scientists and engineers. Due to earthquakes, wind loads, shock and other causes of damage, can visually detect and fix it manually, using traditional methods (program repair and post-restoration) on the crack repair. In the actual structure of concrete works, there are many small cracks, such as matrix micro-cracking etc, these micro-scale damages due to the limitations of detection technologies may be undetectable.

Therefore, it becomes very difficult to repair these undetectable cracks and damages, if not impossible. If the cracks or damages cannot be timely and effectively restoration, the structure will not only affect the normal use of the performance and shorten the life, but also macro-cracks may be triggered and led to structural brittle fracture, resulting in serious catastrophic accidents. There is an urgent need to adopt a certain technology or method, can take the initiative to automatically part of the crack and damage repairing, restore or even increase the strength of concrete materials in order to achieve the purpose of extending the service life of concrete structures. Existing technologies can not improve the solution of concrete micro-cracks self-diagnosing and self-repairing the problems. The self-repairing of the concrete is conducted by adding special components (such like shape memory alloy) to form intelligent self-repairing system that can be automatically triggered to fix the damage or crack of the concrete material.

Self-repairing concrete structures are currently concentrated in the hollow fiber restoration techniques, although in the laboratory technology, hollow fiber capsules was proved to be have self-repairing concrete function, but the construction process of concrete vibrator etc would disturb the arrangement of hollow fiber capsule design, and even lead to rupture of the glass wall material, the premature loss of repairing agent, would be unable to attain the purpose of repairing concrete and affect the feasibility of self-healing process of concrete and self-repairing capacity of the repeatability. During conservation and usage process, micro-cracks and cracks in concrete structures appeared in large numbers, randomly, self-repairing technical requirements for repair capsules evenly distributed in the concrete structure. Due to the brittle restrictions of hollow fiber material, hollow fiber capsules cannot use current technologies to ensure micro-capsule material evenly distributed in the concrete structure, so that, during the concrete structure micro-cracks self-healing process can only adopt special concrete materials and special process, such as self-compacting high performance concrete and non-chopped and crafts. These difficulties limit the hollow fiber capsules crack in the concrete structure of the effectively application of self-repairing works. Hollow fiber capsule's surface properties, wall materials strength, geometry parameters and content on the repair of concrete have significant impacts. Capsule fibrous wall material is smooth, which isn't easy to concrete form an effective phase interface, resulting in lower bond strength of concrete. Hollow fiber capsule has large size, diameter up to millimeters sometimes, which can be considered in the concrete structure, the introduction of fixed agent also inevitably introduces defects, reducing the concrete's own strength and self-healing efficiency. Hollow fiber capsule wall material has large glass strength, micro-cracks of concrete generated by stress, may be difficult to provide enough energy to make hollow fiber capsule rupture, thus, the use of the this technology may only fix large cracks, while micro-crack as the most critical factor for the concrete structure damage fracture repair may be limited. This method shows many problems to be solved in engineering applications, including the fibrous capsule durability, repairing timeliness, interface compatibility, reliability and engineering application of the feasibility of restoration and other issues. Early repair of micro-cracks for the durability of concrete structures is essential, so the use of hollow fiber micro-capsule technology does not apply to repair cracks, which has great limitations.

SUMMARY OF THE INVENTION

It is an object of the present invention to provide a self-repairing concrete having urea-formaldehyde resin polymer micro-capsules that can effectively achieve self-repairing of the micro cracks of the concrete. Through appropriate distribution ratio of components, and process conditions etc, form a polymer micro-capsules self-repairing concrete structures.

The invention's technical program is a used urea-formaldehyde resin polymer micro-capsulesself-repairing concrete, wherein said concrete mixed polymer micro-capsules with repairing concrete function, said concrete mass ratio is concrete: micro-capsules: water=100:1-15:15-50.

A preferred program is wherein said micro-capsules including adhesives, micro-capsules wall packed said adhesives made of urea-formaldehyde resins polymers. Said urea-formaldehyde resin polymer including Melamine-formaldehyde, urea-melamine-formaldehyde, are also described in the application of this invention self-healing concrete material and methods.

A preferred program is wherein said micro-capsules wall polymers and capsule-core mass ratio is 100:40-80, the micro-capsules Shaped like spherical, granules diameter is 10-500 μm, wall thickness is 1-10 μm.

A preferred program is said adhesives are monocomponent adhesives, comprising: mono-component polyurethane adhesives, organosilico anaerobe, acrylic resin adhesives and chloroprene rubber adhesives, or multi-component epoxy adhesives; said adhesives having excellent fluidity and cohesion strength.

A preferred program is said multi-component epoxy adhesives, comprising one or more: bisphenols an epoxy resin, bisphenols F epoxy resin, bisphenols S epoxy resin, resorcinol epoxy resin, organosilicon modified bisphenols A epoxy resin or organotitanium modified bisphenols A epoxy resin.

A preferred program is said micro-capsuless premixed hydrophilc surfactant 0.1-5%, said hydrophilc surfactant uniform distributed in said concrete; said hydrophilc surfactant comprising one or more: sodium alkylbenzenesulfonate, polyoxyethylene, polyglycide or polyol.

A preferred program is said micro-capsules comprising diluents 8-30%, said structure of diluents comprising epoxy group which can improve fluidity of epoxy resin, and together with epoxy resin react with curing agent; said diluents comprising propylene epoxide, propylene epoxide methyl ether, propylene epoxide ether, epichlorohydrin, propylene epoxide, glycidol, epoxidized octene-1, styrene oxide, allyl glycidyl ether, butyl glycidyl ether, phenyl glycidyl ether, cresol glycidyl ether, dibromo-phenyl glycidyl ether, bromo-cresol glycidyl ether, vinyl cyclohexene oxide single-ring, methyl acrylic acid glycidyl ether, 2-ethylhexyl glycidyl ether and tert-butyl phenyl glycidyl ether, etc.

A preferred program is said curing agent is middle-low temperature reaction curing agent, comprising one or more linear chain aliphatic polyamine, polyamide, aromatic amine, modified polyamine, polythiol, carbamide derivative, iminazole derivative; said curing agent and epoxy resin mass ratio is 12-35%.

Another technical program of the invention solve the existing concrete micro-cracks of the self-diagnosis and self-repairing technical problems is providing a method of processing using urea-formaldehyde resins polymers micro-capsuless self-repairing concrete. Through the control of surface properties of micro-capsuless, making micro-capsules and concrete to form a good interface.

A preferred program is a method of processing using urea-formaldehyde resins polymers micro-capsuless self-repairing concrete, comprising:
(1) Weighting enough water, mixing appreciable proportion urea-formaldehyde resins polymers micro-capsuless, stirring gently, still to micro-capsuless well-diversified;
(2) Put water into concrete stirred vessel, mixing corresponding quality concrete;
(3) Stirring concrete slurry slowly, and then stirring concrete slurry rapidly;
(4) Mixing filling agent, comprising dinas, field poured, meaning to put into concrete slurry as three times, each time one third, vibrating, trouble-shooting of bubbles; still filling with mould.

Another technical program of the invention solve the existing concrete micro-cracks of the self-diagnosis and self-repairing technical problems is providing a method of processing using urea-formaldehyde resins polymers micro-capsuless self-repairing concrete. Through appropriate distribution ratio of components, and process conditions etc, form a polymer micro-capsulesself-repairing concrete structures and its surface and internal features, to ensure the representativeness of the sample, in order to better evaluate the integrity of the structure of self-repairing concrete.

A preferred program is using urea-formaldehyde resins polymers micro-capsuless self-repairing concrete, wherein comprising:

(1) Weighting enough water, mixing appreciable proportion urea-formaldehyde resins polymers micro-capsuless, stirring gently, still to micro-capsuless well-diversified;
(2) Put water into concrete stirred vessel, mixing corresponding quality concrete;
(3) Stirring concrete slurry slowly, and then stirring concrete slurry rapidly;
(4) Vibrated concrete slurry, progressively or step by step watering workpiece.
(5) Stewing one or two hours, and then stripping, strike off overflow concrete slurry of mould, stewing 21 to 26 hours;
(6) After disassembly the mould, transferring workpiece to concrete incubator, incubating 25 to 31 days.

The invention providing a method of processing using urea-formaldehyde resin polymer micro-capsulesself-repairing concrete. Through the control of surface properties of micro-capsules, making micro-capsules and concrete to form a good interface. Through appropriate distribution ratio of components, and process conditions etc, form a polymer micro-capsulesself-repairing concrete structures and its surface and internal features, to ensure the representativeness.

The invention using diluents, curing agent and epoxy resin, form a good fluidity, curing high-strength polymer, bonding the crack surface effectively, to the purpose of restore the mechanical properties and the usage.

The invention using the micro-capsules materials, which has good dispersion and stability, through a typical production process of concrete, micro-capsules are evenly dispersed in the matrix of concrete, in the process of mixing and the conservation, micro-capsule material fragmentation does not occur. In the crack process, micro-capsules release adhesives under the stress, repairing the concrete.

In one aspect, the invention provides a class of epoxy adhesives used in concrete materials self-repairing, comprising epoxy resin 100, diluent10-30, curing agent15-35.

Adding epoxy diluents which can reduce the viscosity of the material and increase liquidity. The modified epoxy resin used polymer material parcels. Curing agent can be used directly or be used after micro-encapsulation.

In another aspect, the invention provides methods for preparing self-healing of concrete repairing agent micro-capsules. Prepared by chemical self-healing of concrete composite materials used in micro-capsules technology, wrapped up repair agents such as epoxy resin to form a sealed envelope. The advantages lie in the formation of micro-capsules, the capsule core is isolated from the outside environment, making it from the outside temperature, oxygen and ultraviolet light and other factors, in appropriate conditions, and capsule core can be released after envelope is broken. Used for self-healing of micro-capsules must have the appropriate mechanical strength and heat resistance, active capsule core material should have low viscosity, the expansion coefficient is small after reaction, high performance of adhesive strength, thus, it not only ensure composite molding maintain the integrity of the process, but also in the micro-crack front-end break under stress or heat release capsule core. These methods are: Using urea-formaldehyde resin (UF) package epoxy resin: epoxy resin/urea-formaldehyde prepolymer=60-80:100, system initial acidity pH is 7.0-8.5, temperature is 25° C. Using Lewis acid to adjust pH to 2-4, reacting 2-4 hours at 60-90° C. Cooling, washing by distilled water, drying, to be a white sample.

In another aspect, the invention provides a good dispersion of urea-formaldehyde resin polymer micro-capsules material, which can be used manufacture self-healing of concrete materials, comprising Polymer micro-capsules: 100, Surfactant: 0.5-5.

Mixing surfactant in polymer micro-capsules material, using mixing equipment for mixing. During the self-repairing concrete material preparation process, the micro-capsule material reunion does not occur, and distributed evenly in the concrete structure. In addition, this micro-capsules material can be improved fluidity of concrete slurry.

In another aspect, the invention provides the preparation of self-repairing concrete materials technology, main component is concrete 100, micro-capsules 1-15, and water 15-50.

After typical experiments of concrete process and cracks, manufacture self-repairing concrete materials. In the self-repairing concrete materials, the crack stress makes the micro-capsules rupture, released capsule core was siphon through the micro-cracks capillary, which flow to the crack surface, occurring polymerization reacting with the curing agent, forming a high strength polymers material repairing crack face, so as to achieve the purpose of repair material. Compared with material starting state and the destruction of the state, the mechanical properties of significant recovery, especially the bending strength.

In another aspect, the invention provides methods for preparing self-healing of concrete repairing agent micro-capsules. For the ratio of concrete which includes the organic micro-capsules containing, using the following process can produce evenly dispersion and stability of micro-capsules self-repairing concrete materials, would be not occur fragmentation during mixing and conservation.

(1) Weighting enough water, mixing appreciable proportion urea-formaldehyde resins polymers micro-capsules, stirring gently, still to micro-capsules well-diversified;
(2) Put water into concrete stirred vessel, mixing corresponding quality concrete;
(3) Stirring concrete slurry slowly, and then stirring concrete slurry rapidly;
(4) Vibrated concrete slurry, progressively or step by step watering workpiece.
(5) Stewing one hour, and then stripping, strikes off overflow concrete slurry of mould, stewing 24 hours;
(6) After disassembly the mould, transferring workpiece to concrete incubator, incubating 28 days.

Step (3) of the invention described using of organic materials micro-capsule repair concrete structure manufacturing method, the mixing is to first slow stirring (100-300 rpm), and changed to the rapid mixing (700-1000 rpm).

Step (4) of the invention described using of organic materials micro-capsule repair concrete structure manufacturing method, Vibrated concrete slurry, trouble-shooting of bubbles; still filling with mould, step by step.

Step (4) of the invention described using of organic materials micro-capsules repair concrete structure manufacturing method, field poured, meaning to put into concrete slurry as three times, each time one third, vibrating, trouble-shooting of bubbles; still filling with mould.

The beneficial effect of this invention is contain urea-formaldehyde resin micro-capsules of concrete materials experienced 8 MPa pre-damage and curing treatment, compared with the corresponding concrete material; its flexural strength was unchanged or increased. After the same conditions of concrete materials, flexural strength decreased significantly. These data show that micro-capsules materials during the damage process, epoxy resin was released, reacted with curing agent in the micro-cracks, repaired of damaged structures, achieved to self-repairing concrete materials capabilities. Therefore, the use of micro-capsules can be made self-healing concrete materials, to achieve self-diagnose and repair micro-cracks in concrete, preventing micro-cracks expanded, maintaining the mechanical structure of the building, having great economic value and environmental value.

DETAILED DESCRIPTION

Embodiment 1

Using diluents to improve the fluidity of epoxy resin and adhesive performance, increasing repair efficiency of self-repairing concrete composite materials. adding 20% of the 17 alkyl imidazole curing agent in the E-51 epoxy adhesive, and then adding 20% N-butyl glycidyl ether, the viscosity from the 8200 mpa·s down to 200 MPa·s, the epoxy adhesive fluidity is increasing, which took advantages of capillary siphon; tensile strength varied from 14.0 MPa to 17.6 MPa, modulus from 223.3 MPa increase to 334.0 MPa, which proved that N-butyl ether improve the mechanical properties of epoxy resin. FTIR analyzed showing that the diluents involved in the epoxy adhesive and curing agent cross-linking reaction.

Embodiment 2

Figure 1:
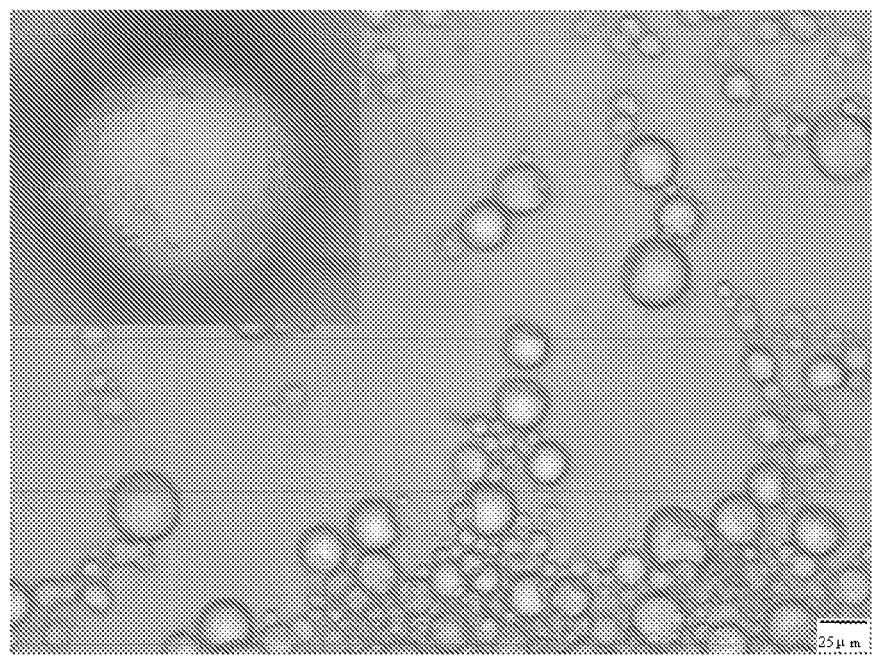
FIG. 1 shows the invention using of urea-formaldehyde resin polymer micro-capsules self-repairing concrete spread UF/epoxy micro-capsules.

With urea-formaldehyde resin as an envelope, put capsule core materials such as repair agents epoxy resin wrapped, preparation for self-repairing concrete composite material micro-capsuless. Dissolved 10.0 grams urea in 20.0 grams 37% formaldehyde, using triethanolamine adjusted pH to 8.5, in mixing state and 70° C. constant temperature conditions, reacted 1 hour, obtained prepolymer. Added 80-160 ml distilled water, add 14.0 grams epoxy resin of example 1 said, a strong stirring for 20 minutes, got a better stability of the oil/water emulsion. Within 2 hours, with 2% sulfuric acid adjusts pH to 4-5. In the stirring speed 300-1200 rpm, reaction temperature 50-80° C. conditions, reacted 2-3 hours. Product was cooled, washed by distilled water, dried and other steps got a white micro-capsule material. The micro-capsuless howed spherical, with an average particle diameter of 120 microns, wall thickness of 3.5 microns, electron microscope photographs shown in FIG. 1.

Embodiment 3

Using surfactant to improve the manufacture of concrete self-repairing polymer materials micro-capsuless fluidity and dispersion. Mixed 1.5 grams sodium dodecyl benzene sulfonate the invention said in 100 grams of polymer micro-capsules of epoxy resin material, and then stirring for 30 minutes, got a good fluidity and dispersion powder-like substance.

Embodiment 4

Using urea-formaldehyde resin or melamine-formaldehyde or urea-melamine-formaldehyde polymer micro-capsule material for preparing self-repairing concrete samples. Weight 38.0 grams of water, add 2.0 grams of urea-formaldehyde resin micro-capsules to said water, stirring till micro-capsuless fully dispersed; pouring water into the concrete mixing container, mixed 100.0 grams concrete; stirring, vibrating, and watering the workpiece etc; Stewed one hour, and then stripping, scraped mold overflow of concrete slurry, Stewed 24 hours; After disassembly the mould, transferring workpiece to concrete incubator, incubating 28 days.

Figure 2:
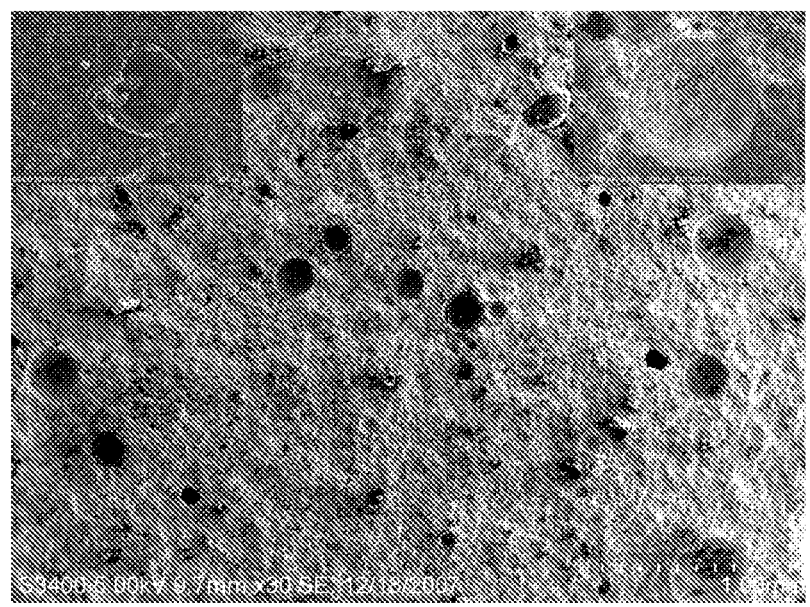
FIG. 2 shows the fracture morphology of self-repairing concrete composite materials.
Figure 3:
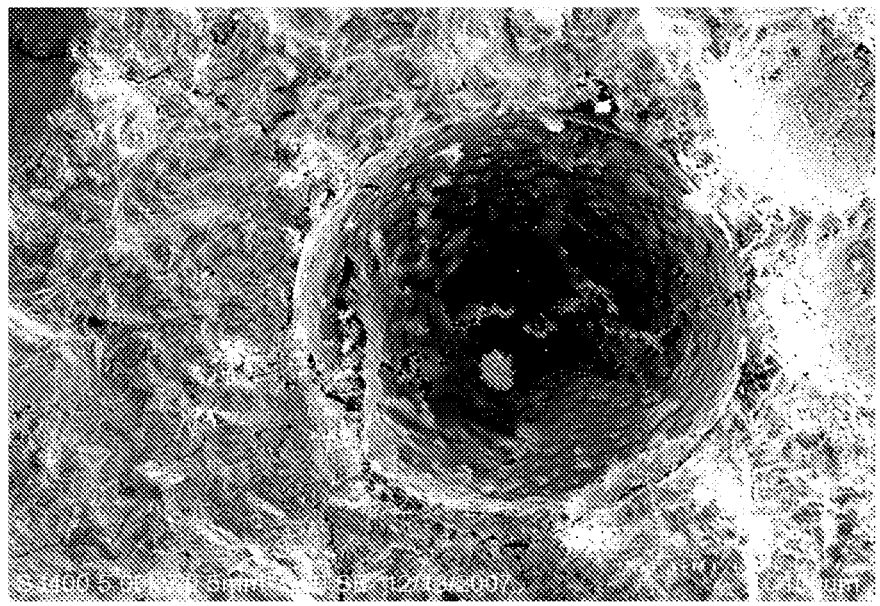
FIG. 3 shows the UF micro-capsules/concrete interface of self-repairing concrete composite materials.

Flexural strength testing and fracture morphology for self-repairing concrete. In the fracture process, most of organic micro-capsule destruction under the stress, a small portion appearance organic micro-capsules/concrete interface separation, shown in FIG. 2. Organic micro-capsules and concrete can be formed a good interface, shown in FIG. 3. Testing mechanical properties using three-point bending method, the sample size was 4 cm×4 cm×16 cm, imposed 8 MPa generated pre-cracks. Flexural strength of concrete materials was 11.3 MPa. After the designed destruction pressure, flexural strength of concrete decreased to 5.5 MPa. The organic micro-capsules concrete composite material through the designed destruction pressure and heat repair process, the flexural strength of 11.15 MPa, through the same pressure damage and repair processes at room temperature, flexural strength was 10.0 MPa. These figures showed that: concrete composite materials used organic micro-capsules, compared with material starting state and the destructed state, bending strength was little change or increase, mechanical properties was significant recovery, proved that the organic micro-capsules had functions for the concrete structure micro-cracks repair. In the self-repairing concrete materials, the crack stress makes the micro-capsules rupture, released capsule core was siphon through the micro-cracks capillary, which flow to the crack surface, occurring polymerization reacting with the curing agent, forming a high strength polymers material repairing crack face, so as to achieve the purpose of repairing material.

Embodiment 5

Using urea-melamine-formaldehyde polymer micro-capsules material for preparing self-repairing concrete. Weight 38.0 grams of water, add 5.0 grams of micro-capsules to said water, stirring till micro-capsuless fully dispersed; pouring water into the concrete mixing container, mixed 60.0 grams concrete, 20.0 grams of sandstone, 10 grams of phosphorous slag powder and 10 grams of fly ash and other materials; stirring, vibrating, and watering the workpiece etc; Stewed one hour, and then stripping, scraped mold overflow of concrete slurry, Stewed 24 hours; After disassembly the mould, transferring workpiece to concrete incubator, incubating 28 days.

Embodiment 6

Methods for preparing self-healing of concrete using melamine-formaldehyde polymer micro-capsules, which can produce evenly dispersion and stability of micro-capsulesself-repairing concrete materials.

(1) Weighting enough water, mixing appreciable proportion urea-formaldehyde resins polymers micro-capsules, stirring gently, still to micro-capsules well-diversified;
(2) Put water into concrete stirred vessel, mixing corresponding quality concrete;
(3) Stirring concrete slurry slowly (300 rpm), and then stirring concrete slurry rapidly (800 rpm);
(4) Vibrated concrete slurry, step by step watering workpiece, field poured, meaning to put into concrete slurry as three times, each time one third, vibrating, trouble-shooting of bubbles; still filling with mould.
(5) Stewing one hour, and then stripping, strikes off overflow concrete slurry of mould, stewing 24 hours;
(6) After disassembly the mould, transferring workpiece to concrete incubator, incubating 28 days.

Figure 4:
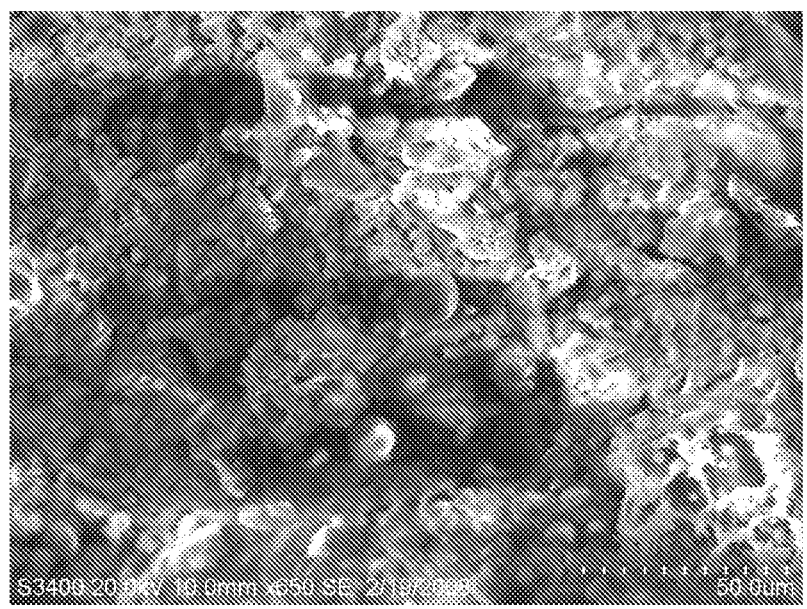
FIG. 4 shows the UF micro-capsules didn't were broken during concrete manufacturing process.

Take a sample from said concrete, using 5% sulfuric acid corroded 5 minutes, rinse with distilled water. Dried, electron microscopy observed, shown as FIG. 4. During the concrete material prepared by mixing, curing and maintenance process, used micro-capsules didn't was broken. This phenomenon indicated that use polymer micro-capsule technology to prepare self-healing process concrete material has good operability, self-repairing properties repeatability and the industrial applications.

The above is only exemplary description, not beyond the invention's scope and spirits, technical personnel in this field would devise a variety of implementation modalities depending on the actual. For example, according to the actual need to design a slightly different ratio or specific steps, which belong to the scope of protection of the invention.

We claim:

1. A urea-formaldehyde resin polymer micro-capsules self-repairing concrete, comprising:
   a predetermined amount of concrete, micro-capsules and water being mixed together, wherein each of said micro-capsules has a size about 10-500 microns and comprises a capsule wall and an adhesive received in said capsule wall, wherein a mass ratio of said concrete, micro capsules, and water is 100:1-15:15-50, wherein when said capsule wall of one of said micro-capsules is cracked, said adhesive is released from said micro-capsule for flowing to a fracture surface of said concrete structure so as to repair said fracture surface thereof, wherein said capsule wall of each of said micro-capsules is made of urea-formaldehyde resin polymer.

2. The self-repairing concrete, as recited in claim 1, wherein a mass ratio of said capsule wall and said adhesive is 100:40-80, wherein a thickness of said capsule wall is about 1-10 microns.

3. The self-repairing concrete, as recited in claim 2, wherein each of said micro-capsules has a spherical shape with a diameter about 10-500 microns.

4. The self-repairing concrete, as recited in claim 3, wherein said adhesive is a mono-component adhesive selected from the group consisting of mono-component polyurethane adhesives, organosilico anaerobe, acrylic resin adhesives, chloroprene rubber adhesives, and multi-component epoxy adhesives.

5. The self-repairing concrete, as recited in claim 4, wherein said multi-component epoxy adhesive consists of one or more of bisphenol A epoxy resin, bisphenol F epoxy resin, bisphenol S epoxy resin, resorcinol epoxy resin, silicone modified bisphenol A epoxy resin or organic titanium modified bisphenol A epoxy resin.

6. The self-repairing concrete, as recited in claim 5, wherein said micro-capsules are pre-mixed with 0.1-0.5% hydrophilic surfactant by weight based on the weight of said micro-capsules and are uniformly distributed in said concrete, wherein said hydrophilic surfactant comprises one or more of sodium alkylbenzenesulfonate, polyoxyethylene, poly-glycide compound or polyol.

7. The self-repairing concrete, as recited in claim 6, wherein each of said micro-capsules further comprises 8-25% diluent by weight based on the weight of said micro-capsule, said diluent comprising a curing agent chemically reacting with epoxy resin and improving liquidity of said epoxy resin.

8. The self-repairing concrete, as recited in claim 7, wherein said curing agent, which is a middle-low temperature reaction curing agent, comprises one or more of linear chain aliphatic polyamine, polyamide, aromatic amine, modified polyamine, polythiol, carbamide derivative, iminazole derivative, wherein a mass ratio of said curing agent and said epoxy resin is about 12-35%.

9. The self-repairing concrete, as recited in claim 2, wherein said adhesive is a mono-component adhesive selected from the group consisting of mono-component polyurethane adhesives, organosilico anaerobe, acrylic resin adhesives, chloroprene rubber adhesives, and multi-component epoxy adhesives.

10. The self-repairing concrete, as recited in claim 9, wherein said multi-component epoxy adhesive consists of one or more of bisphenol A epoxy resin, bisphenol F epoxy resin, bisphenol S epoxy resin, resorcinol epoxy resin, silicone modified bisphenol A epoxy resin or organic titanium modified bisphenol A epoxy resin.

11. The self-repairing concrete, as recited in claim 10, wherein said micro-capsules are pre-mixed with 0.1-0.5% hydrophilic surfactant by weight based on the weight of said micro-capsules and are uniformly distributed in said concrete, wherein said hydrophilic surfactant comprises one or more of sodium alkylbenzenesulfonate, polyoxyethylene, poly-glycide compound or polyol.

12. The self-repairing concrete, as recited in claim 11, wherein each of said micro-capsules further comprises 8-25% diluent by weight based on the weight of said micro-capsule, said diluent comprising a curing agent chemically reacting with epoxy resin and improving liquidity of said epoxy resin.

13. The self-repairing concrete, as recited in claim 12, wherein said curing agent, which is a middle-low temperature reaction curing agent, comprises one or more of linear chain aliphatic polyamine, polyamide, aromatic amine, modified polyamine, polythiol, carbamide derivative, iminazole derivative, wherein a mass ratio of said curing agent and said epoxy resin is about 12-35%.

14. The self-repairing concrete, as recited in claim 1, wherein said adhesive is a mono-component adhesive selected from the group consisting of mono-component polyurethane adhesives, organosilico anaerobe, acrylic resin adhesives, chloroprene rubber adhesives, and multi-component epoxy adhesives.

15. The self-repairing concrete, as recited in claim 14, wherein said multi-component epoxy adhesive consists of one or more of bisphenol A epoxy resin, bisphenol F epoxy resin, bisphenol S epoxy resin, resorcinol epoxy resin, silicone modified bisphenol A epoxy resin or organic titanium modified bisphenol A epoxy resin.

16. The self-repairing concrete, as recited in claim 15, wherein said micro-capsules are pre-mixed with 0.1-0.5% hydrophilic surfactant by weight based on the weight of said micro-capsules and are uniformly distributed in said concrete, wherein said hydrophilic surfactant comprises one or more of sodium alkylbenzenesulfonate, polyoxyethylene, poly-glycide compound or polyol.

17. The self-repairing concrete, as recited in claim 16, wherein each of said micro-capsules further comprises 8-25% diluent by weight based on the weight of said micro-capsule, said diluent comprising a curing agent chemically reacting with epoxy resin and improving liquidity of said epoxy resin.

18. The self-repairing concrete, as recited in claim 17, wherein said curing agent, which is a middle-low temperature reaction curing agent, comprises one or more of linear chain aliphatic polyamine, polyamide, aromatic amine, modified polyamine, polythiol, carbamide derivative, iminazole derivative, wherein a mass ratio of said curing agent and said epoxy resin is about 12-35%.

* * * * *